United States Patent
Kennedy et al.

(10) Patent No.: US 7,225,543 B2
(45) Date of Patent: Jun. 5, 2007

(54) CONNECTOR FOR STRUCTURAL SANDWICH PLATE MEMBERS

(75) Inventors: Stephen John Kennedy, Ontario (CA); Howard Mackenzie Wilson, Lymington (GB)

(73) Assignee: Intelligent Engineering (Bahamas) Limited, Nassau (BS)

( * ) Notice: Subject to any disclaimer, the term of this patent is extended or adjusted under 35 U.S.C. 154(b) by 178 days.

(21) Appl. No.: 10/492,926

(22) PCT Filed: Oct. 3, 2002

(86) PCT No.: PCT/GB02/04470

§ 371 (c)(1), (2), (4) Date: May 17, 2004

(87) PCT Pub. No.: WO03/033337

PCT Pub. Date: Apr. 24, 2003

(65) Prior Publication Data

US 2004/0253472 A1    Dec. 16, 2004

(30) Foreign Application Priority Data

Oct. 15, 2001    (GB) ................... 0124734.5

(51) Int. Cl.
*B21D 47/00*    (2006.01)

(52) U.S. Cl. ............... 29/897.32; 52/582.1; 52/742.13; 428/57; 403/271; 403/272

(58) Field of Classification Search ............ 403/167, 403/168, 270, 271, 272; 114/357, 356; 29/897.32; 52/582.1, 309.9, 742.13; 428/57
See application file for complete search history.

(56) References Cited

U.S. PATENT DOCUMENTS

| | | | | |
|---|---|---|---|---|
| 3,074,123 | A | * | 1/1963 | Gartrell ..................... 52/586.2 |
| 4,443,988 | A | * | 4/1984 | Coutu, Sr. ................. 52/309.9 |
| 4,455,468 | A | * | 6/1984 | Satterthwaite ............. 403/272 |
| 4,725,507 | A |   | 2/1988 | Lescaut |
| 5,778,813 | A |   | 7/1998 | Kennedy |
| 6,050,208 | A | * | 4/2000 | Kennedy .................... 114/357 |
| 6,192,720 | B1 |  | 2/2001 | Kan |
| 6,193,137 | B1 | * | 2/2001 | Ezumi et al. ............ 228/112.1 |

FOREIGN PATENT DOCUMENTS

GB    2337022    11/1999

* cited by examiner

*Primary Examiner*—Daniel P. Stodola
*Assistant Examiner*—Michael P. Ferguson
(74) *Attorney, Agent, or Firm*—Darby & Darby

(57) ABSTRACT

A connecting member for structural sandwich plate members comprises a prismatic metal body having one, or preferably two, tapered edges which provide landing surfaces and weld preparations for the face plates of the structural sandwich plate members.

9 Claims, 6 Drawing Sheets

CONNECTOR FOR STRUCTURAL SANDWICH PLATE MEMBERS

The present invention relates to connectors for joining together structural sandwich plate members, which plate members comprise outer metal plates bonded together by a core layer plastics or polymer material which transfers shear forces therebetween, and to structures formed by connecting together structural sandwich plate members.

Structural sandwich plate members, known commercially as SPS™, are described in U.S. Pat. No. 5,778,813, British Patent Application GB-A-2 337 022 and International Application No. GB00/04198, which documents are incorporated herein by reference. Such structural sandwich plate members comprise outer metal plates bonded together by a plastics or polymer core with sufficient strength to transfer shear forces therebetween. The plastics or polymer core may be solid and continuous, occupying the entire volume between the outer metal plates, or may be interrupted by, e.g. foam, forms which leave continuous plastics or polymer connections between the outer metal plates. A principal use of these structural sandwich plate members is to replace stiffened steel structures, e.g. in maritime, offshore and civil engineering applications. In such applications, the structural sandwich plate members enable the elimination of some or all stiffening elements providing a simpler structure that is easier to construct and maintain. In particular, the amount of welding necessary is generally substantially reduced as compared to a conventional stiffened steel structure.

A further advantage of such structural sandwich plate members is that they can be prefabricated, either as individual plate members or as more complex modules to be assembled into the eventual structure. Pre-fabricated modules can be made under factory conditions to greater accuracy than traditional structures can be assembled on site and further ease construction.

It is an aim of the present invention to provide a method of assembling and connecting together structural sandwich plate members without the necessity for a range of special sections yet that still provides flexibility in the connections that can be made.

According to the present invention there is provided a connecting member for use in joining a structural sandwich plate member, which comprises first and second metal face plates and a plastics or polymer core bonding said face plates together with sufficient force to transfer shear forces therebetween, to another member, said connector comprising an elongate metal body of substantially constant cross-section and having at least one tapered edge formed by first and second inclined surfaces, said inclined surfaces serving as landing surfaces and weld preparations for said first and second metal face plates.

The connecting member according to the present invention enables structural sandwich plate members of various thicknesses, both in the outer plates and the core layer, to be assembled and connected to other structural sandwich plate members or conventional steel plates with ease and with a reduced number of different connecting members.

The connecting member according to the present invention provides integral preformed weld preparations for both construction of the structural sandwich plate members and for connection to other plates or members.

The connecting member according to the present invention may be provided with a shear key in one or both major faces corresponding in size and shape to at least part of the tapered edge of the connecting member. This facilitates connection of structural sandwich plate members at right angles.

The connecting member may be rolled steel, stainless steel, extruded aluminum or made of two dissimilar metals that are explosion bonded together. The connecting member would then be made of metal compatible with the face plates of the structural sandwich plate member to facilitate welding.

A further advantage is that the geometry of the connector within the structural sandwich plate member cavity is such that it reduces localized shear stresses along the face plate core interface that may occur from temperature loads. The tapered ends may be further modified to look like dove-tail joints to enhance the bond between the core material and the perimeter bars.

The present invention also provides structures comprising at least one structural sandwich plate member and a connecting member as described above.

Yet further, the present invention provides a method of manufacturing a component of a structure comprising the steps of:

providing a connecting member comprising an elongate metal body of substantially constant cross-section and having at least one tapered edge formed by first and second inclined surfaces;

welding first and second metal plates to said connecting member in a spaced apart relationship to define a cavity, said first and second inclined surfaces serving as landing surfaces and providing weld preparations for said first and second metal plates respectively; and injecting plastics or polymer material into said cavity to bond said first and second metal plates together with sufficient strength to transfer shear forces therebetween.

The present invention will be further described below with reference to the following description of exemplary embodiments and the accompanying drawings, in which.

Figure 14:
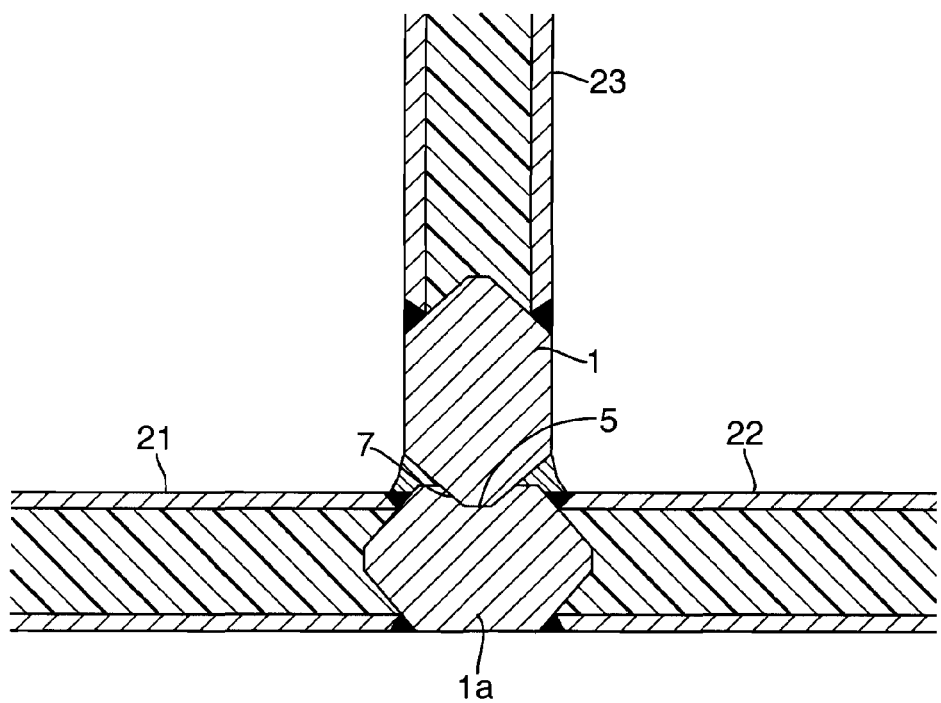
Figure 15:
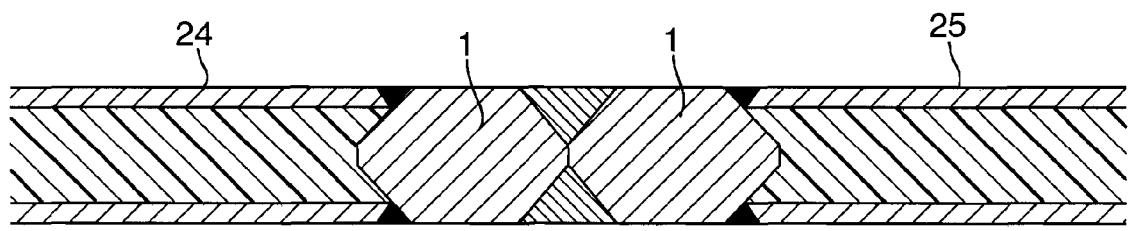

FIG. 14 illustrates the connection of parallel and perpendicular structural sandwich plate members using a connecting member according to the first embodiment of the present invention and a connecting member according to the second embodiment of the present invention; and FIG. 15 illustrates connection of two modules by their edges using connecting members according to the first embodiments of the present invention.

In the drawings, like parts are indicated by like references.

Figure 1:
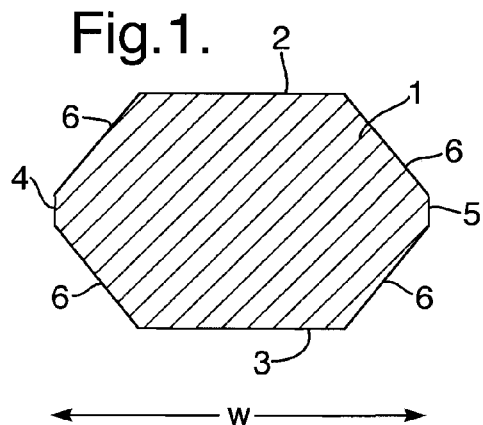
FIG. 1 is a cross-sectional view of a connecting member according to a first embodiment of the present invention.

FIG. 1 shows in cross-section a connecting member 1 according to a first embodiment of the present invention. In its basic form, it is substantially prismatic (i.e. of substantially constant cross-section) with first and second major faces 2, 3 and first and second tapered edges 4, 5. The ends of the connecting member are similar, equal and parallel polygons and its sides are parallelograms. However, in some applications, the ends of the connecting member may be modified, e.g. mitred to form a frame. Localized derivations from the basic cross-section may also be required in specific applications for example for joining members other than at right angles. The tapered edges 4, 5 have angled surfaces 6 which provide a landing surface and weld preparation for the face plates of a structural sandwich plate member.

Figure 2:
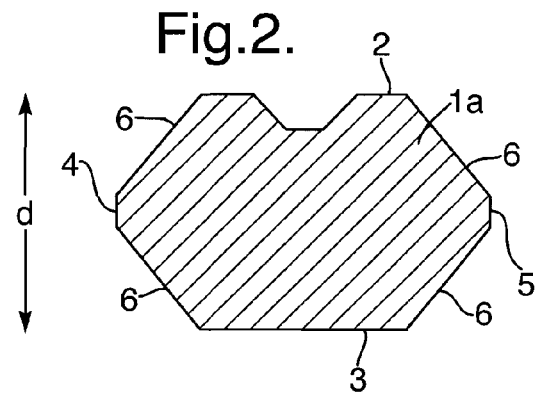
FIG. 2 is cross-sectional view of a connecting member according to a second embodiment of the present invention.

A connecting member 1a according to a second embodiment of the present invention is shown in cross section in FIG. 2. The connecting member 1a according the second embodiment is similar to that of the first embodiment save that a shear key 7 is provided in one of the major faces 2, running the entire length of the connecting member 1a. The shear key 7 is shaped to receive one of the tapered edges of a connecting member according to the present invention and provides increased shear resistance across connecting joints as well as facilitating erection alignment in a manner described below.

Figure 3:
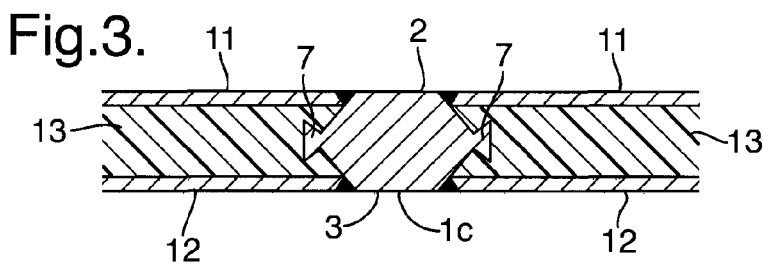
FIG. 3 is a cross-sectional view of a connecting member according to a third embodiment of the invention joining two structural sandwich plate members.

A third embodiment of the connecting member 1c according to the present invention is shown in FIG. 3. The connecting member 1c has flared parts 7 on its tapered edges, resembling in cross-section a dove-tailed joint. As can be seen from the figure, the flared parts 7 improve the bond between connecting member 1c and the core layer 13 of a structural sandwich plate member to which the connecting member 1c is attached. Although flared parts 7 are shown on both tapered edges, it will be appreciated that the flared part can be provided on only one tapered edge of the connecting member 1c.

The connecting members according to the present invention should have sufficient depth d to accommodate structural sandwich plate members with a range of core thicknesses and plate thicknesses. For example, a connector may have a thickness d of about 35 mm to accommodate core thicknesses from 5 mm to 25 mm in combination with average face plate thicknesses up to 5 mm. It will be appreciated that the two face plates of the structural sandwich plate member need not be the same thickness nor of the same metal. Connectors with a larger thickness d may be provided to accommodate structural sandwich plate members with greater core and plate thicknesses, e.g. 25 mm to 75 mm and 5 mm to 20 mm respectively.

The overall width w of the connecting members 1, 1a may range from a minimum practical size comparable to the thickness d to approximately 20 times the thickness d. The width w is determined according to the complexity of anticipated connection in which it is to be used and the ability of the connector to dissipate heat resulting from welding operations conducted after the core material has been injected to the cavity between face plates. For wider connectors, e.g. w>3d, more than one shear key 7 may be provided, if desired.

The angle of the landing surfaces 6 forming the tapered edge is dependant upon its function to provide a suitable weld preparation and may be in the range of from 30° to 60° with respect to either principal axis of the connecting member. The tip width of the tapered edges 4, 5 may be varied to determine the minimum weld between connectors or provide a full butt weld as required. Whilst the tapered edges are shown identical and symmetric about the centre line of the connecting member, it will be appreciated that they may be different and may be offset.

The connecting members 1, 1a may be manufactured of rolled steel or extruded aluminum, or may be constructed of two metals that are explosion bonded together. Appropriate surface treatments for the intended application and to facilitate welding may be applied.

In use, connecting members 1, 1a according to the present invention are provided around part, or preferably all, of the perimeter of a structural sandwich plate member. The face plates of the structural sandwich plate member are welded to respective ones of the landing surfaces 6 of one of the tapered edges 4 or 5 of the connecting member 1, 1a in a spaced apart relationship. The resulting cavity, which may previously have been provided with shear plates or void forms is injected with a plastics or polymer material to form a core layer capable of transferring shear forces between the two face plates. If the structural sandwich plate member is to have the same total thickness as the thickness d of the connecting member 1, 1a, the two face plates will be flush with respective ones of the major faces 2, 3 of the connecting member 1, 1a. For a thinner structural sandwich plate member, the face plates may be welded symmetrically about the tapered edge 4, 5 of the connecting member 1, 1a or one face plate may be positioned flush with one of the major faces 2, 3 and the other face plate will then be recessed from the other major face.

The other tapered edge of the connecting member provides landing surfaces 6 and weld preparations for welding to another connecting member forming part of the periphery of another structural sandwich plate member or to a conventional metal plate. It will also be appreciated that the two landing surfaces 6 of the other tapered edge may receive two further face plates to form a second structural sandwich plate member.

In general, both flat and curved structural sandwich plate members can be manufactured by welding their face plates to connecting members according to the present invention. The resulting structural plate members are joined to metal plates or other structural sandwich plate members by conventional welding processes using the connecting members according to the present invention. In this way large sections, modules and blocks are assembled which eventually become bridge panels, ship components, ships, off-shore structures or other engineered structures. When making connections, connecting members according to a present invention may be welded together in an aligned state, parallel but offset or at an angle, e.g. perpendicular. In this way, a large number of different arrangements can be accommodated.

Figure 4:
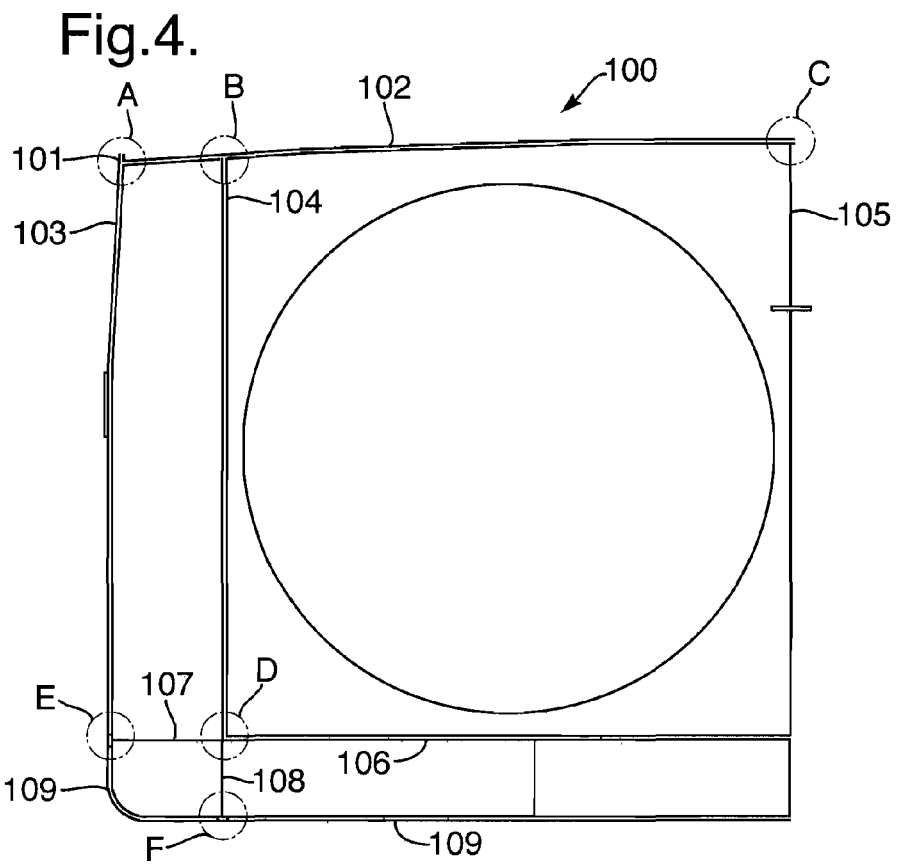
FIG. 4 is a partial mid-ship cross-section of a double hull tank constructed using connecting members according to the present invention.

FIG. 4 illustrates how the connecting members according to the present invention can be used to provide different connecting details. This figure shows a mid-ship section of a double hull tanker. Connecting members according to the present invention are used, inter alia, in the connections indicated as A to F, which are shown enlarged in FIGS. 5 to 10 respectively.

Figure 5:
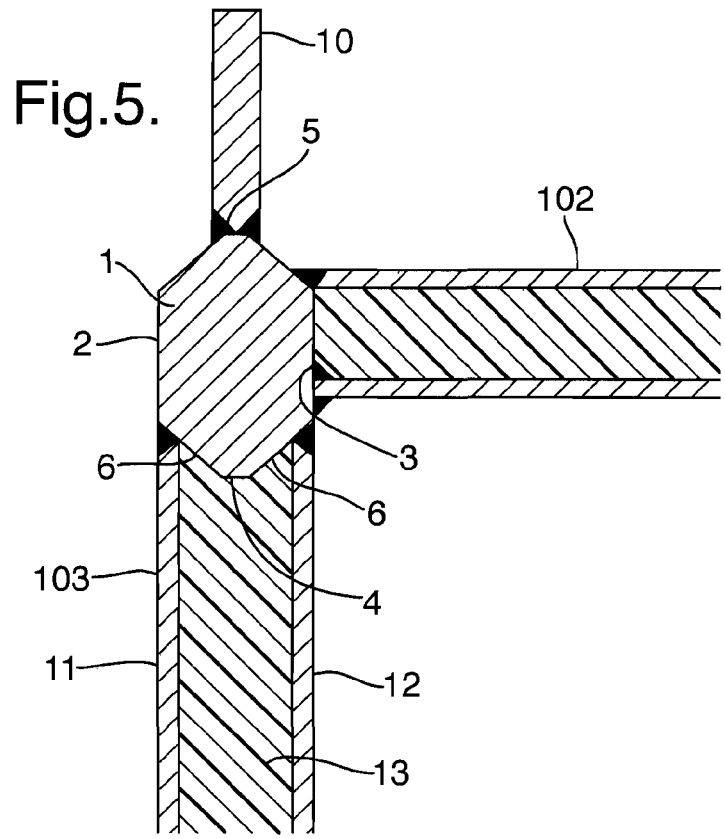
FIGS. 5 to 10 are respectively enlarged views of details A to F in FIG. 4.

FIG. 5 shows connection A which is the connection between the gunwale 101, deck 102 and outer side shell 103. In this construction, the connecting member 1 forms one side of a plate member forming part of the outer side shell 103 with the face plates 11, 12 of that structural sandwich plate member being welded to the landing surfaces 6 of one tapered edge 4, flush with the major faces 2,3. As described above, the core layer 13 is injected after the face plates 11, 12 are welded to the connecting member 1. The gunwale 101, formed as a conventional steel plate, it is welded to the other tapered edge 5. The deck 102 is formed as a structural sandwich plate member with upper face plate 11 welded to the inboard landing surface 6 of tapered edge 5 and the lower face plate 12 fillet welded to major surface 3 of the connecting member 1.

Figure 6:
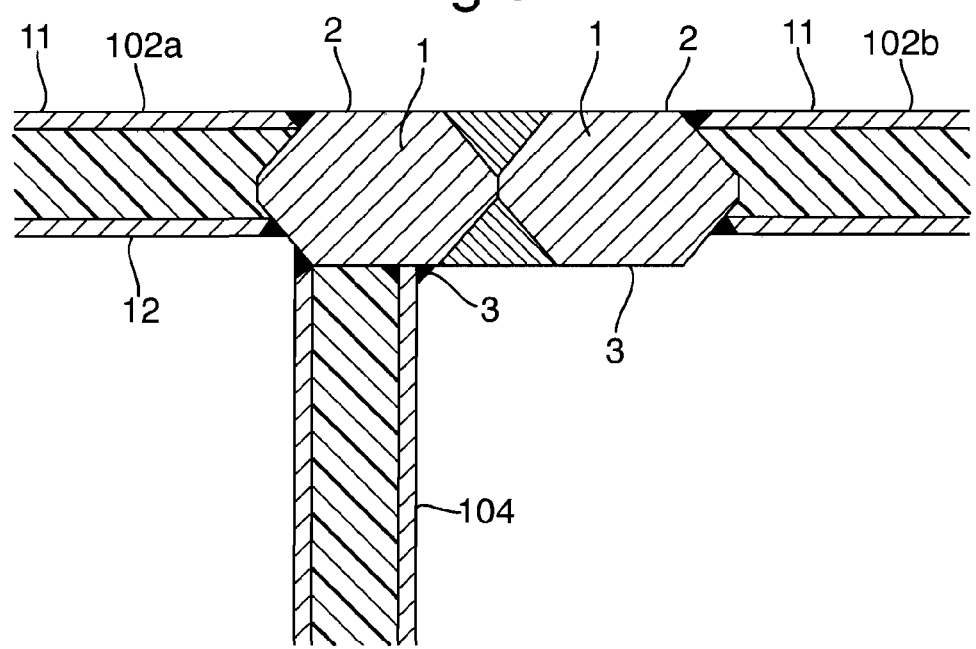

The connection of the inner side shell 104 to the deck 102, connection B, is shown in FIG. 6. Two structural sandwich plate members 102a, 102b forming part of the deck have connecting members 1 each forming a side of the respective structural sandwich plate member. The two connecting members 1 are welded together and the inner side shell 104, formed as a structural sandwich plate member, is welded to the lower face of one of the connectors 1. It will be seen that the upper face plates 11 of the deck 102 are flush with the upper faces 2 of the connecting members 1 to provide a smooth deck surface. The lower face plates 12 are set above the lower faces 3 of the connectors 1 as the structural sandwich plate members of the deck do not need to be of the same thickness as the connecting member 1.

Figure 7:
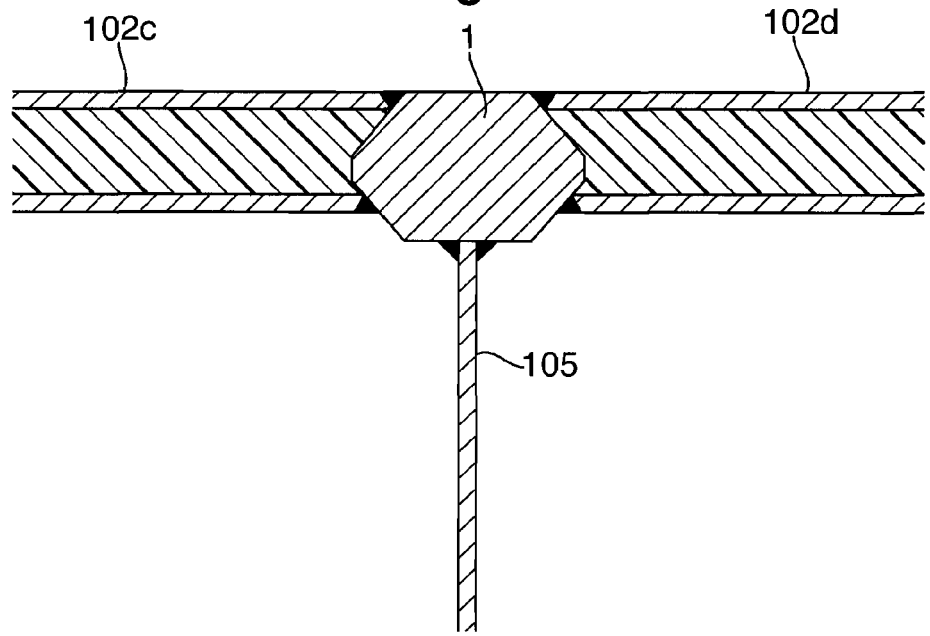

Connection C, shown in FIG. 7, is a connection between the deck 102 and a longitudinal girder 105, connections between the deck and transverse beams are similar. Here, a connecting member 1 joins two structural sandwich plate members 102c, 102d forming part of the deck whilst the longitudinal girder 105 is fillet welded to the lower face 3 of the connecting member 1.

Figure 8:
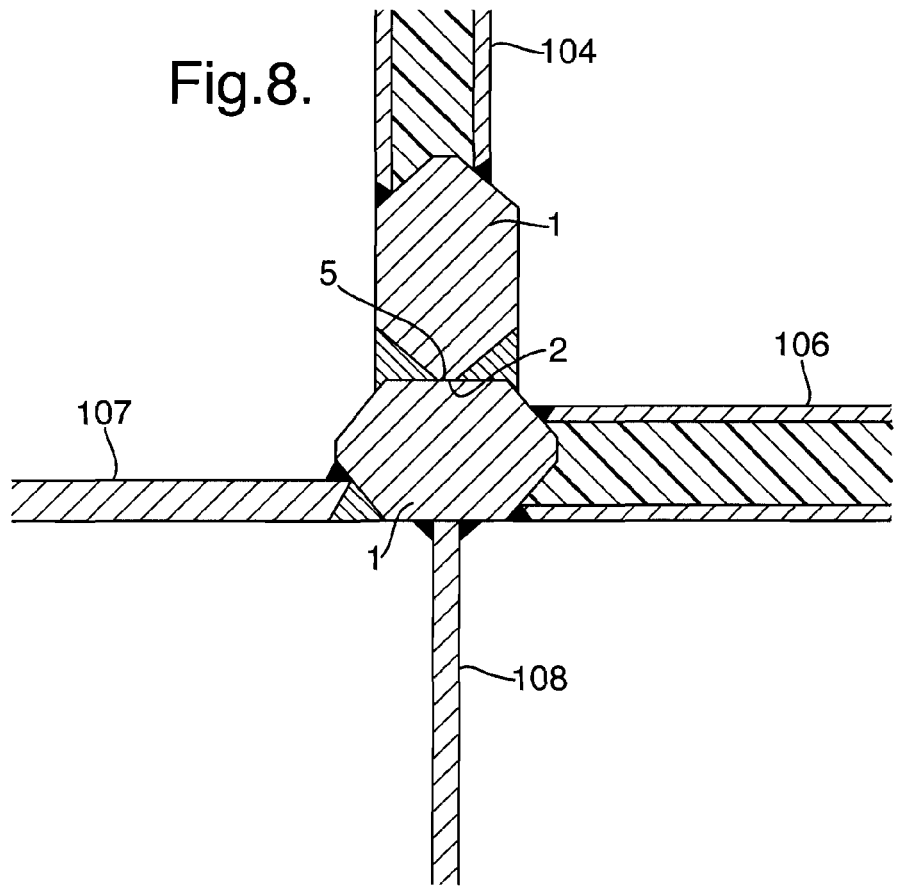

FIG. 8 shows connection D, the connection between the inner bottom 106 and inner side shell 104. In this connection, the structural sandwich plate members forming the inner side shell 104 and inner bottom 106 have connecting members 1 provided at their peripheries. The free tapered edge 5 of the connecting member of the inner side shell 104 is welded to the upper face 2 of the connecting member 1 of the inner bottom 106. Girders 107, 108 connecting to the outer side shell and outer bottom are welded to the free tapered edge 5 and the lower major face 3 respectively of the connecting member 1 of the inner bottom 106.

Figure 9:
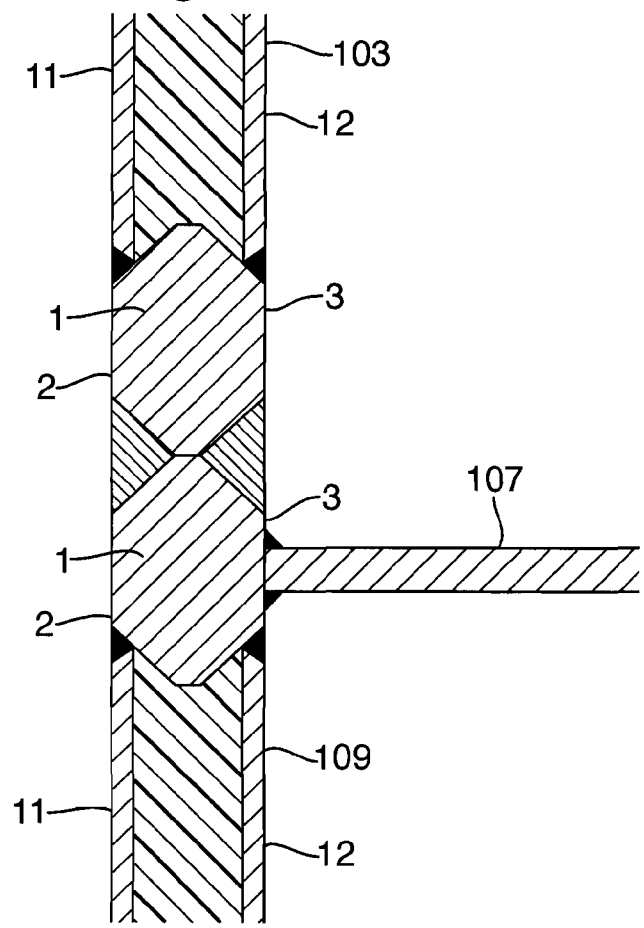

The inner bottom and outer side shells are aligned and each is formed as a structural sandwich plate member. The two structural sandwich plate members have connecting members 1 forming their upper and lower side edges which are welded together as shown in FIG. 9. The structural sandwich plate members of the outer side shell 103 and outer bottom 109 have the same thickness as the connecting members 1 so that the face plates are flush with the major faces of the connecting members on both sides. A girder 107 connecting to the junction of the inner side shell and inner bottom is fillet welded to the lower of the two connecting members 1.

Figure 10:
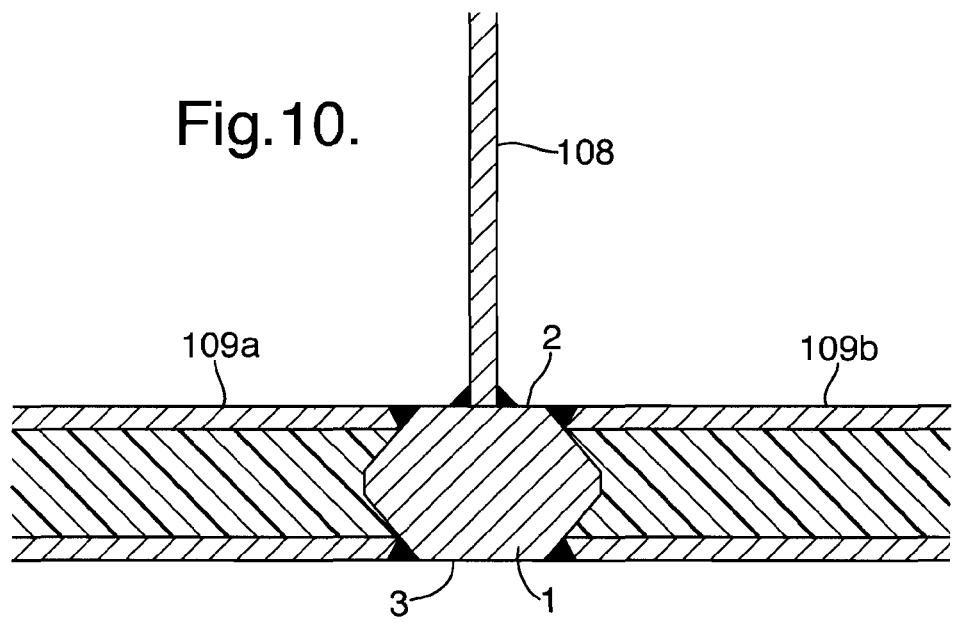

Finally, connection F is shown in FIG. 10. In this connection, which connects the outer bottom 109 to a girder 108, two structural sandwich plate members 109a, 109b forming part of the outer bottom 109 are joined using a connecting member 1. The inner and outer face plates of the structural sandwich plate members 109a, 109b are flush with the major faces 2, 3 of the connecting member 1. The girder 108 is then fillet welded to the uppermost of the major faces of the connecting member 1. Connections between a transverse beam and the outer bottom or between web frames of the side shell, and the inner or outer side shells 103, 104 structural sandwich plate members, are similar.

Figure 11:
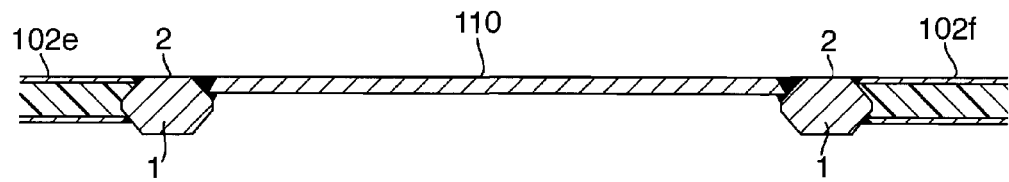
FIG. 11 illustrates the connection of a conventional steel plate between two structural sandwich plate members using connecting members according to the first embodiment of the present invention.
Figure 12:
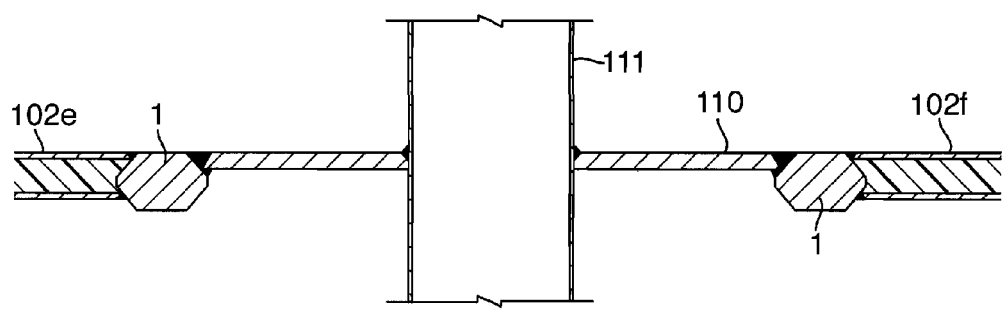
FIG. 12 illustrates the connection of a plate having a penetration between two structural sandwich plate members using connecting members according to the first embodiment of the present invention.
Figure 13:
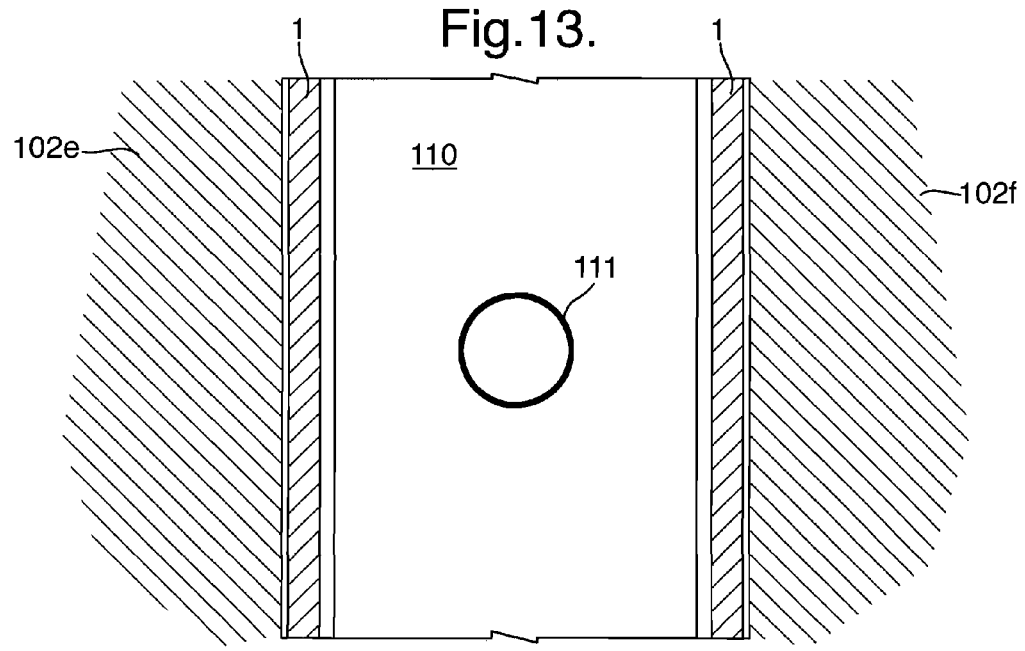
FIG. 13 is a plan view of the arrangement shown in FIG. 12.

FIG. 11 shows an arrangement whereby a deck can conveniently be formed with conventional steel plates 110 inset into a deck largely formed from structural sandwich plate members 102e, 102f. The perimeters of the structural sandwich plate members 102e, 102f are formed with connecting members 1 with their upper major faces 2 flush with the upper face plates of the structural sandwich plate members 102e, 102f. The conventional metal plate 110 is then welded between the two connecting members 1 again with its upper surface flush with the major faces 2 of the connecting members 1. This arrangement facilitates the provision of penetrations through the deck, as shown in FIG. 12 where a pipe 111 penetrates the conventional steel plate 110. This arrangement is also shown in plan in FIG. 13. This arrangement of integrated steel plates, which may be arranged in a quilted pattern suitable for the intended function of the structure, also provides areas for welding attachments without detriment to the plastics or polymer core or adjacent structural sandwich plate members. The metal plate is dimensioned to provide structural continuity between structural sandwich plate members and is stocky enough to inhibit local plate buckling.

FIG. 14 shows the use of the shear key 7 in a connecting member 1a according to the second embodiment of the present invention. This arrangement is used to connect three structural sandwich plate members 21, 22, 23 with two of them aligned and the third perpendicular. The two aligned structural sandwich plate members 21, 22 are formed by welding face plates to the opposite tapered edges of a structural sandwich plate member 1a according to the second embodiment of the present invention. The perpendicular structural sandwich plate member 23 has a connecting member 1 according to the first embodiment of the present invention as part of its periphery. The free tapered edge 5 of the connecting member 1 engages in the shear key of the connecting member 1a. Engagement of the tapered edge 5 of connecting member 1 to shear key 7 facilitates alignment of the structural sandwich plate member 23 and the transfer of out-of-plane forces from structural sandwich plate member 23 to structural sandwich plate members 21 and 22.

Where prefabricated modules 25 are built up from structural sandwich plate members using connecting members according to the present invention, the edges of the modules are preferably terminated with connecting members 1 according to the present invention. As shown in FIG. 15 the landing surfaces 6 thus form weld preparation for the substantial welds required to connect the modules together.

Whilst we have described above embodiments of the present invention and possible uses for them, it will be appreciated that the connecting member of the present invention may be constructed differently than as described and may be used in other ways, as will occur to the skilled reader. The present invention is not to be limited save within the scope of the appended claims.

The invention claimed is:

1. A method of manufacturing a component of a structure comprising the steps of:
   providing a connecting member comprising an elongate metal body having a longitudinal axis, a substantially constant cross-section perpendicular to said longitudinal axis and at least one tapered edge parallel to said longitudinal axis and formed by first and second inclined surfaces;
   welding first and second metal plates to said connecting member in a spaced apart relationship to define a cavity, said first and second inclined surfaces serving as landing surfaces and providing weld preparations for said first and second metal plates respectively; and
   injecting plastics material into said cavity to bond said first and second metal plates together with sufficient strength to transfer shear forces therebetween.

2. A method according to claim 1 further comprising the step of welding a further member to said connecting member.

3. A method according to claim 2 wherein said connecting member has a second tapered edge formed by third and fourth inclined surfaces and said step of welding a further member comprises:
   welding third and fourth metal plates to said connecting member in a spaced apart relationship to form a second cavity, said third and fourth inclined surfaces serving as landing surfaces and providing weld preparations for said third and fourth metal plates respectively; and
   injecting plastics material into said second cavity to bond said third and fourth metal plates together with sufficient strength to transfer shear forces therebetween.

4. A method according to claim 2 wherein said step of welding a further member comprises:
   providing a structural sandwich plate member comprising third and fourth metal plates welded at their peripheries to a second connecting member and a core layer of plastics material bonded to said third and fourth metal plates with sufficient strength to transfer shear forces therebetween; and
   welding said second connecting member to said connecting member.

5. A method according to claim 1 wherein said step of welding a further member comprises welding a steel plate to said connecting member.

6. A method according to claim 1 wherein said connecting member has a second tapered edge and further comprises the steps of:
   providing a structural sandwich plate member comprising third and fourth metal plates welded at their peripheries to a second connecting member and a core layer of plastics material bonded to said third and fourth metal plates with sufficient strength to transfer shear forces therebetween, said second connecting member having a shear key in a major face thereof, said shear key having a shape corresponding to the second tapered edge of said connecting member;
   engaging said second tapered edge of said connecting member in said shear key; and
   welding said second connecting member to said first connecting member.

7. A method of building a structure comprising the steps of:
   manufacturing a plurality of structural components according to the method of claim 1; and
   assembling said structural components to form said structure.

8. A method according to claim 7 wherein said steps of manufacturing and assembling are carried out at different sites.

9. A method according to claim 7 wherein said structure is a building, a bridge, a ship, ship component or an off-shore structure.

* * * * *